United States Patent [19]

Ikeno

[11] Patent Number: 5,604,552
[45] Date of Patent: Feb. 18, 1997

[54] SELECTABLE APERTURE SHAPE CAMERA

[75] Inventor: Tomohisa Ikeno, Tokyo, Japan

[73] Assignee: Nikon Corporation, Tokyo, Japan

[21] Appl. No.: 646,559

[22] Filed: May 8, 1996

Related U.S. Application Data

[63] Continuation of Ser. No. 482,506, Jun. 7, 1995, abandoned, which is a continuation of Ser. No. 83,163, Jun. 29, 1993, abandoned.

[30] Foreign Application Priority Data

Jul. 17, 1992 [JP] Japan ............................... 4-050218 U

[51] Int. Cl.⁶ ......................................... G03B 37/00
[52] U.S. Cl. ......................... 396/436; 396/435; 396/281
[58] Field of Search ............................. 354/94, 159, 222, 354/465, 486

[56] References Cited

U.S. PATENT DOCUMENTS

| | | | |
|---|---|---|---|
| 4,803,505 | 2/1989 | Saijo et al. .................................. | 354/80 |
| 5,059,993 | 10/1991 | Harvey ..................................... | 354/222 |
| 5,066,971 | 11/1991 | Kodaira ................................. | 354/159 X |
| 5,086,311 | 2/1992 | Naka et al. ............................ | 354/94 X |
| 5,257,055 | 10/1993 | Cho et al. ................................ | 354/222 |

FOREIGN PATENT DOCUMENTS 3-238439  10/1991  Japan.
3-238440  10/1991  Japan.

*Primary Examiner*—Safet Metjahic
*Assistant Examiner*—J. K. Han
*Attorney, Agent, or Firm*—Shapiro and Shapiro

[57] ABSTRACT

A camera enables photography with a plurality of image plane formats and comprises an aperture portion having an opening for permitting photographic light to pass therethrough, a light shielding member movable between at least two predetermined positions to change a shape of the opening in the aperture portion, an operation member for moving the light shielding member to change the shape of the opening in the aperture portion, a detecting device for detecting a position of the light shielding member, and a warning device for providing a warning in response to a detection of the detecting device that the light shielding member is not located in any of the predetermined positions.

45 Claims, 7 Drawing Sheets

SELECTABLE APERTURE SHAPE CAMERA

This is a continuation of application Ser. No. 08/482,506 filed Jun. 7, 1995, which is a continuation of application Ser. No. 08/083,163 filed Jun. 29, 1993, both abandoned.

BACKGROUND OF THE INVENTION

1. Field of the Invention

The present invention relates to a camera having an aperture portion an opening shape of which can be changed.

2. Related Background Art

As an example of the camera capable of taking a photograph with changeable shape of opening in an aperture portion for permitting photographic light to pass therethrough, there is a camera switchable between a normal image plane size and a panoramic image plane size, as proposed in Japanese Laid-open Patent Application No. 3-238439 and No. 3-238440. The camera is provided with a pair of light shielding plates near an aperture having an opening for permitting photographic light of normal image plane size to pass therethrough. Each of the shielding plates has an edge parallel to a facing frame edge of the aperture. Operating an operation member provided on the camera, each of the shielding plates is moved toward the other frame edge of the aperture, whereby the opening of the aperture may be switched between the normal image plane size and the elongated panoramic size.

However, if the operation of the operation member was incomplete, or if the movement of the light shielding plates was interrupted, for example, by intrusion of dust into an operating portion of the shielding plates, the shielding plates would be stopped halfway between the normal photographic position and the panoramic photographic position. Such a state would cause a problem of leaving an unexposed portion on the film if a photographer intended to take a normal photograph. Also, if the photographer intended to take a panoramic photograph, the problem of incorrect exposure would be caused, which results in failure in obtaining a photograph of correct panoramic size on the film. Further, the above state would cause a trouble of improper operation during automatic operation such as the mode change of automatic exposure, the autozooming of a zoom lens, and the mode change of photometry in the normal photographic state or in the panoramic photographic state.

The operational state of shielding plates could be checked while opening a back lid of camera body, but cannot be checked when a film is loaded.

SUMMARY OF THE INVENTION

It is an object of the present invention to provide a camera in which an operation of operation member can move a light shielding member to change a shape of the opening in an aperture portion which is an opening portion for permitting photographic light to pass therethrough, and which can accurately inform a user of a moving state of the shielding member.

The present invention provides a camera which has an aperture portion as an opening portion for permitting photographic light to pass therethrough, a light shielding member provided as movable between at least two predetermined positions for changing the aperture portion among a plurality of predetermined opening shapes, and an operation member on which a manual operation is applied, wherein the shape of opening in the aperture portion can be changed by moving the light shielding member in response to the manual operation applied on the operation member, and which is characterized in that the camera comprises detecting means for detecting a position of the light shielding member and warning means for providing a warning when the detecting means detects that the light shielding member is at a middle position between the predetermined positions.

Further, the present invention provides a camera which has an aperture portion as an opening portion for permitting photographic light to pass therethrough, a light shielding member provided as movable between at least two predetermined positions for changing the aperture portion among a plurality of predetermined opening shapes, and an operation member on which a manual operation is applied, wherein the shape of opening in the aperture portion can be changed by moving the light shielding member in response to the manual operation applied on the operation member, and which is characterized in that the camera comprises detecting means for detecting a position of the light shielding member and inhibiting means for inhibiting photography when the detecting means detects that the light shielding member is at a middle position between the predetermined positions.

According to the present invention, a warning is given to a user when the light shielding member is at a middle position between the predetermined positions, whereby the user may be accurately informed of the operating state of light shielding member. Also, photography is inhibited when the light shielding member is at a middle position between the predetermined positions, whereby an error in photography may be well prevented.

DESCRIPTION OF THE PREFERRED EMBODIMENTS

An embodiment of the present invention will be described referring to FIG. 1 to FIG. 6.

In the present embodiment there are the following shapes of opening in an aperture portion: a normal photographic image plane for permitting photographic light to pass through the entire opening in the aperture; and a panoramic photographic image plane for permitting photographic light to pass through an elongated opening obtained by shielding the upper and lower portions of the aperture.

Figure 1:
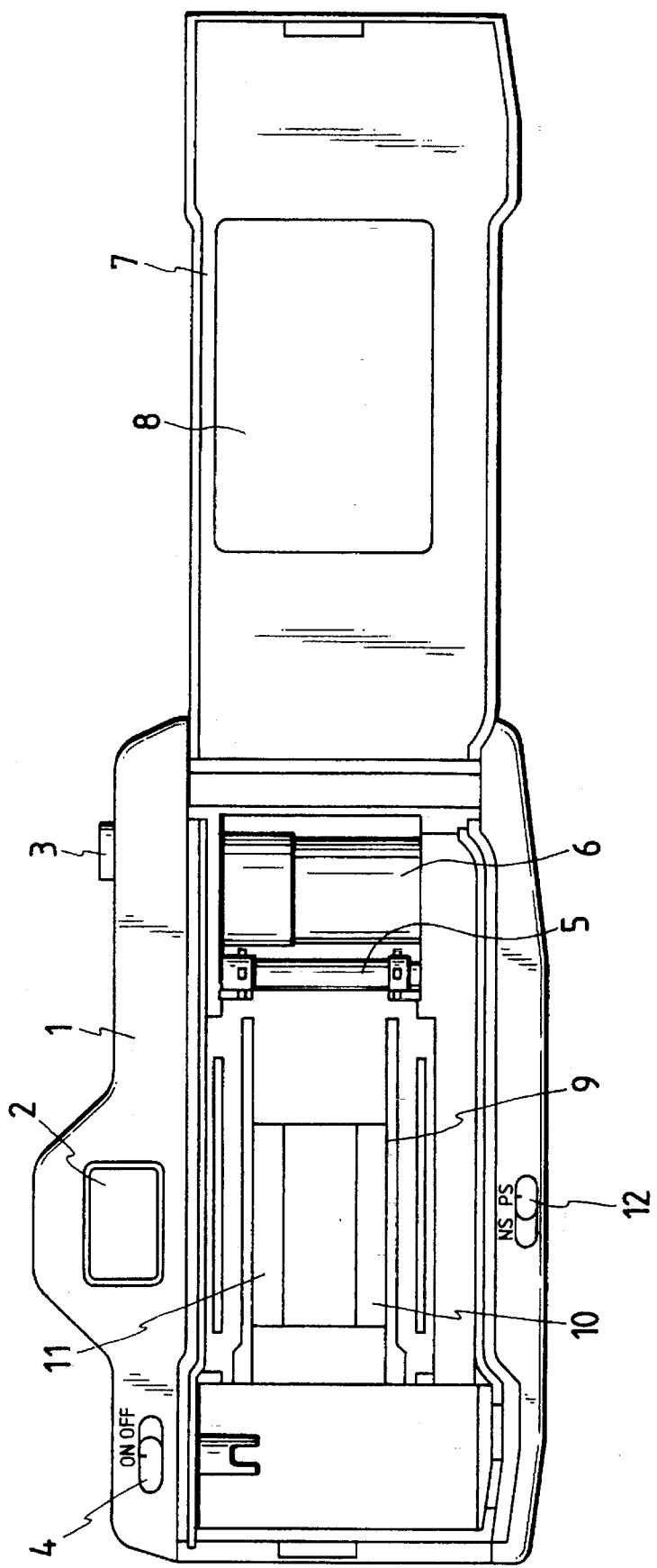
FIG. 1 is a rear view to show a state that a back lid of camera is opened-in an embodiment according to the present invention.

FIG. 1 is a rear view of a single lens reflex camera with a back lid being open in an embodiment of the present invention. Disposed in a camera body 1 are a finder eye piece window 2, a release button 3 arranged to be pushed in two stages, (to a half-press state with the first stage push and a full-press state with the second stage push to start photography), a power lever 4 arranged as slidable for choosing the state of power between the on state and the off state, a film feed sprocket 5, a film feed spool 6, a back lid 7 which can be opened and closed, a press plate 8, and an aperture 9 for permitting photographic light of normal image plane size to pass therethrough. As will be described in detail later, there are a lower light shielding plate 10 and an upper light shielding plate 11 provided as slidable near the aperture 9 to change the photographic image plane size into the panoramic size. Further, a switch lever 12 is disposed on the camera body 1, for moving the light shielding plates 10, 11.

In the state of FIG. 1 the panoramic size is selected, in which the light shielding plates 10, 11 are inserted into the upper portion and the lower portion of aperture 9. Sliding the switch lever 12 to the left, the light shielding plates 10, 11 are withdrawn outside the aperture 9 to make the normal photographic state.

Figure 2:
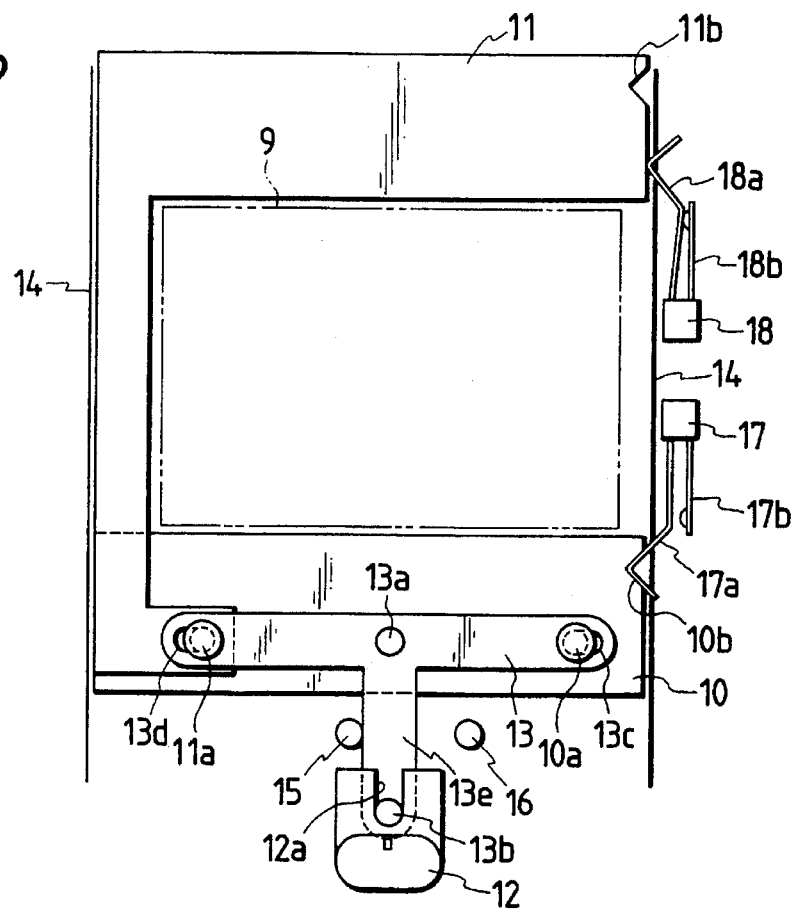
FIG. 2 is an elevation to show a light shielding plate driving mechanism in a normal photographic state.

FIG. 2 is an elevation to show a driving mechanism of the light shielding plates 10, 11. A slide shaft 10a is fixed in the lower light shielding plate 10, on which a notch 10b is formed. A slide shaft 11a is fixed in the upper shielding plate 11, on which a notch 11b is formed.

The switch lever 12 is provided with a U-shaped arm 12a having a through groove 12b. A P-shaped drive plate 13 transmits the slide of switch lever 12 to the light shielding plates 10, 11, is rotatably supported on a shaft 13a provided on the camera body 1, and has a fixed shaft 13b and slide holes 13c, 13d.

The slide shaft 10a of the lower light shielding plate 10 and the slide shaft 11a of the upper light shielding plate 11 are rotatably and slidably associated with the slide hole 13c and with the slide hole 13d, respectively. The fixed shaft 13b is rotatably and slidably associated with the arm 12a of the switch lever 12. Two guides 14 are fixed on the camera body vertically along the aperture 9 to constrain the light shielding plates 10, 11 to move only in the vertical direction. Stoppers 15, 16 are fixed in the camera body 1 as contactable with the arm 13e of the drive plate 13.

A switch 17 is disposed to contact with a side of the lower light shielding plate 10 on the notch 10b is formed. The switch 17 has two contact segments 17a and 17b. The switch is turned off in a non-contact state of the contact segments 17a and 17b while the fore end of the contact segment 17a is fit in the notch 10b of the lower light shielding plate 10, but turned on in a contact state of the contact segments while the contact segment 17a is on the side of the lower light shielding plate 10 outside the notch 10b and is bent. A switch 18, which has a similar structure to the switch 17, is disposed to contact with the side of the upper light shielding plate 11 on which the notch 11b is formed.

Figure 3:
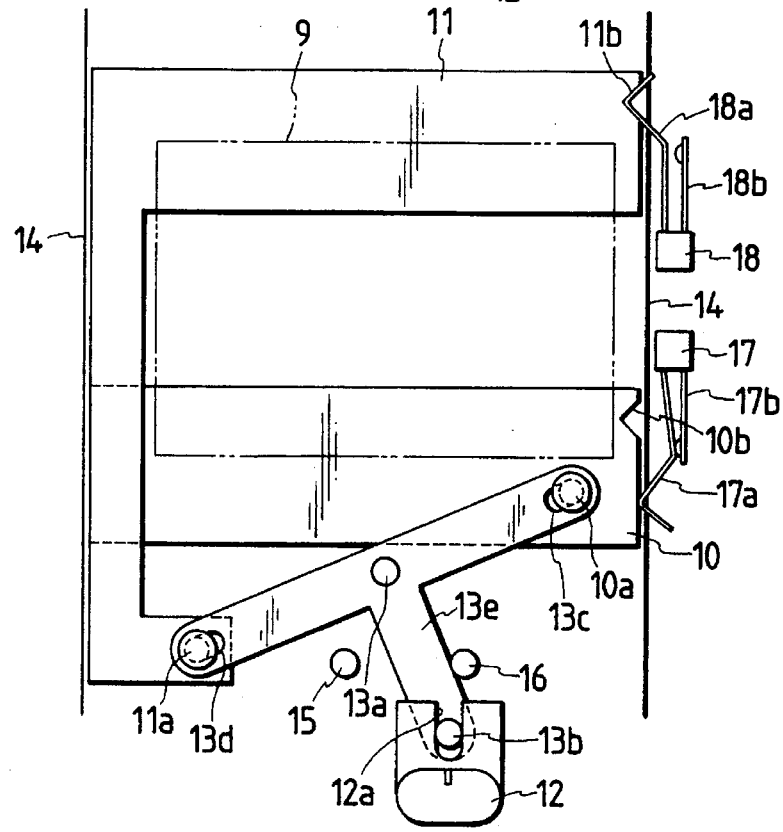
FIG. 3 is an elevation to show the light shielding plate driving mechanism in a panoramic photographic state.

An operation of this mechanism is next described. FIG. 2 shows a state of normal photographic mode, in which the light shielding plates 10, 11 are withdrawn outside the aperture 9 after the switch lever 12 is slid left. If the switch lever 12 is slid from the state of FIG. 2 to the right, the drive plate 13 rotates counterclockwise about the shaft 13a. The lower light shielding plate 10 moves upward along the guides 14, because the slide shaft 10a is connected with the slide hole 13c of the drive plate 13. The upper light shielding plate 11 moves downward along the guides 14, because the slide shaft 11a is connected with the slide hole 13d of the drive plate 13. While the lower light shielding plate 10 is moving upward, the fore end of the contact segment 17a of the switch 17 leaves the notch 10b to come to contact with the contact segment 17b so as to make the switch turned on. At this moment the fore end of the contact segment 18a of the switch 18 has not fallen into the notch 11b of the upper light shielding plate 11 and keeps contacting with the contact segment 18b. When the switch lever 12 is further slid right, the arm 13e of the drive plate 13 comes to contact with the stopper 16 so as to restrict further movement. At this moment, the lower light shielding plate 10 is located at the uppermost position and the upper light shielding plate 11 at the lowermost position, where the fore end of the contact segment 18a of the switch 18 has fallen in the notch 11b to maintain the light shielding plates 10, 11 there and the contact segment 18a moves out of contact with the contact segment 18b to make the switch 18 turned off, achieving the panoramic photographic mode. FIG. 3 shows this state.

When the switch lever 12 is slid back to the left from the state of FIG. 3, the drive plate 13 rotates clockwise to move the lower light shielding plate 10 downward and the upper light shielding plate 11 upward. The switch 18 is first turned on, the fore end of the contact segment 17a of the switch 17 then falls into the notch 10b to maintain the light shielding plates 10, 11 there, and the contact segment 17a moves out of contact with the contact segment 17b to make the switch 17 turned off, achieving the normal photographic mode.

If the photographer were to attempt to slide the switch lever 12 from the state of FIG. 2 further to the left, the drive plate 13 would be stopped because of the contact of the arm 13e with the stopper 15, whereby the light shielding plates 10, 11 would be kept stationary. Also, if the photographer were to attempt to slide the switch lever 12 from the state of FIG. 3 further to the right, the drive plate 13 would be stopped because of the contact of the arm 13e with the stopper 16, whereby the light shielding plates 10, 11 would be kept stationary.

Figure 4:
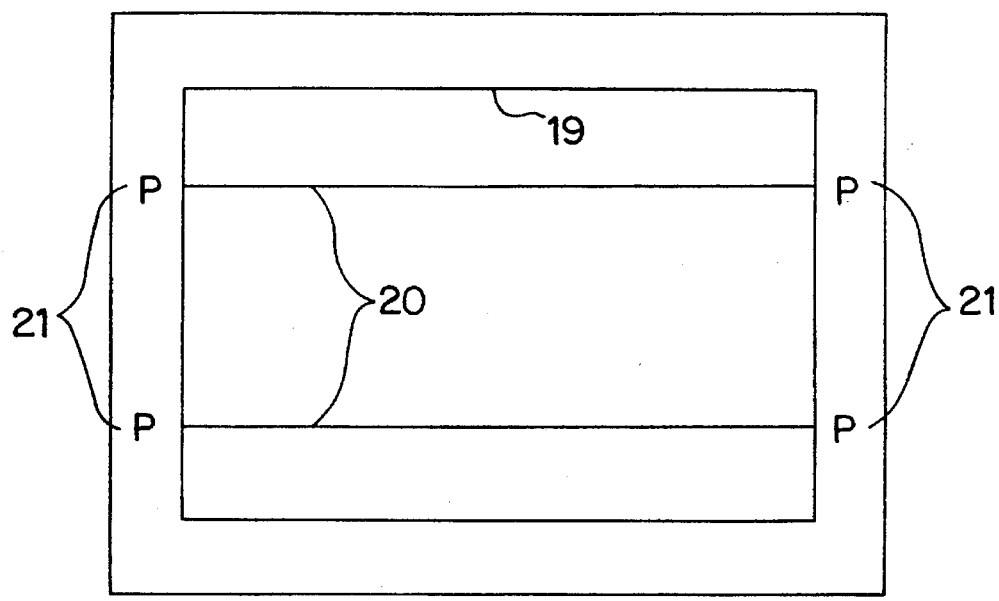
FIG. 4 is an elevation to show an indication condition in a finder of the camera in the embodiment according to the present invention.

Accordingly, the switch 17 is off and the switch 18 is on in the normal photographic mode, while the switch 17 is on and the switch 18 is off in the panoramic photographic mode. Other combinations represent abnormal states. FIG. 4 shows a field in the finder eye piece window 2, in which a field frame 19 shows a photographic image plane in the normal photographic mode and two upper and lower score lines 20 are engraved on a finder screen to show a photographic image plane in the panoramic photographic mode. An indicating device 21, which is constructed by using an LED indicating device, is disposed on either side of the field frame 19 outside thereof. The indicating device 21 is kept off in the normal photographic mode but turned on in the panoramic photography. The indicating device 21 is turned on and off (or flashed) to give a warning of incorrect photographic mode, if both the switch 17 and the switch 18 are on or if both the switch 17 and the switch 18 are off.

Figure 5:
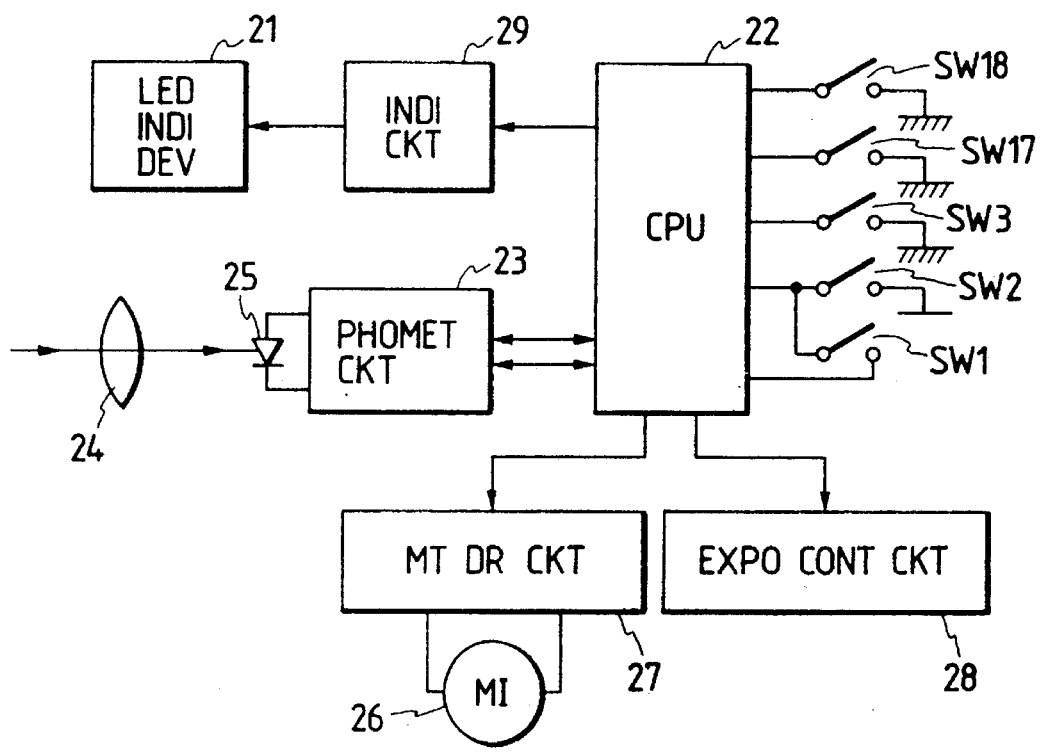
FIG. 5 is a block diagram of the camera in the embodiment according to the present invention.

FIG. 5 is a block diagram of the camera. A photometry circuit 23 is connected to a CPU 22. A photo sensor 25 is connected to the photometry circuit 23 to receive light from a subject having passed through a lens 24, and the photometry circuit 23 calculates luminance information about luminance of subject based upon a detection signal of the photo sensor 25 to supply the calculation result to the CPU 22. Further connected to the CPU 22 are a motor drive circuit 27 of a film winding/rewinding motor 26, an exposure control circuit 28, and switches SW1 and SW2 which are turned on in synchronism with the press operations on the release button 3 (FIG. 1). When the release button 3 is in the half-press state the switch SW1 is turned on to generate a half-press signal, and when it is in the full-press state the switch SW2 is turned on to generate a full-press signal.

The CPU 22 starts operating the photometry circuit 23 as described above when the half-press signal is generated. If the full-press signal is subsequently generated, the CPU 22 drives the exposure control means such as the aperture and the shutter through the exposure control circuit 28 to carry out photography, and then drives the motor 26 to wind the film by a frame.

Further connected to the CPU 22 are an indication circuit 29, a switch SW3, and the aforementioned switches 17, 18. The LED indicating device 21 is connected to the indication circuit 29. The switch SW3 is a switch which is turned on in synchronism with the slide motion of the power lever 4 (FIG. 1).

Figure 6:
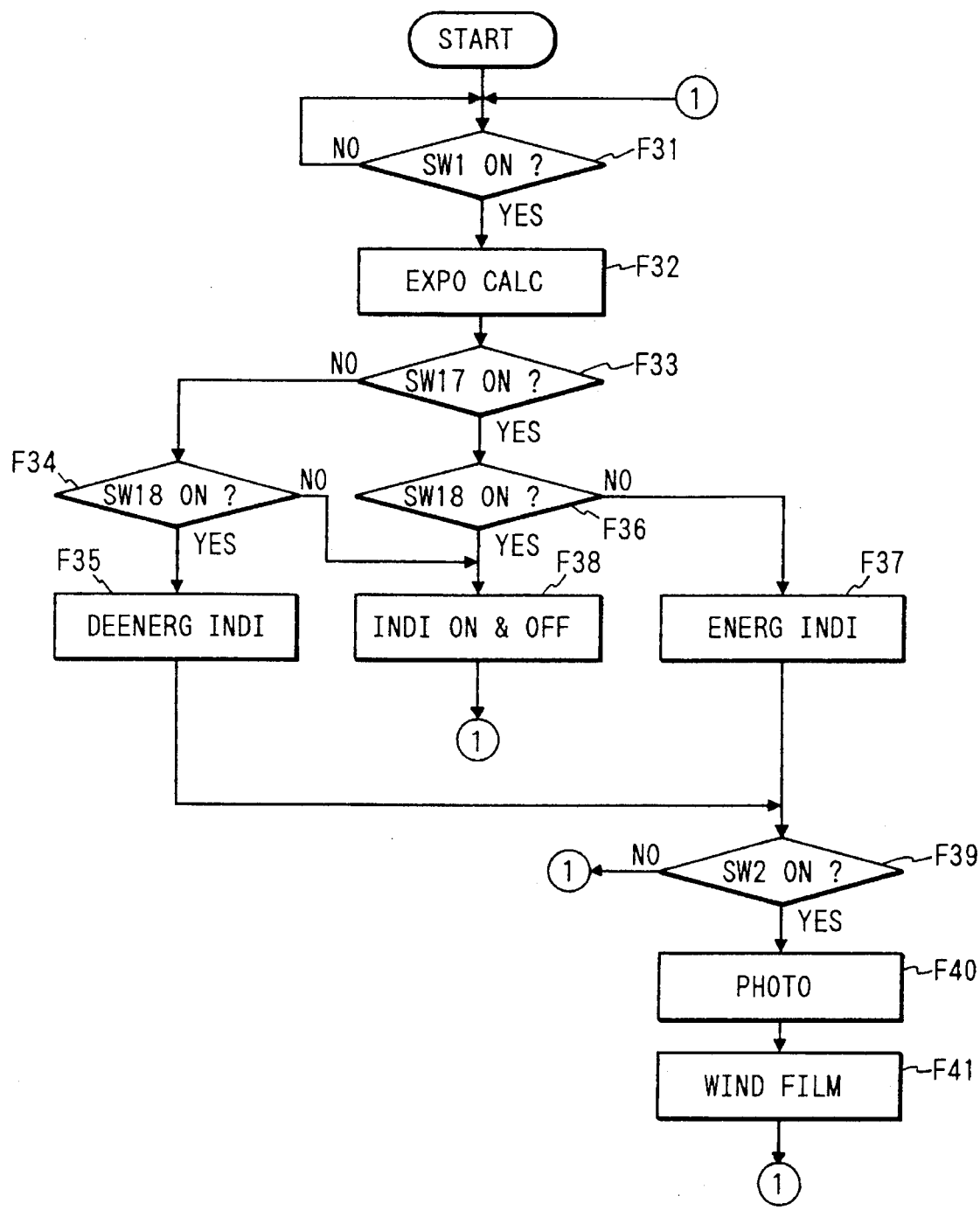
FIG. 6 is a flowchart to show a flow of control of CPU in the embodiment according to the present invention.

A flow of control executed in the CPU 22 is next described with the flowchart of FIG. 6.

This flowchart is started when the power switch SW3 is turned on.

At Step F31 it is judged whether SW1 is on, that is, whether the release button 3 is half-pressed. The judgement is affirmative if the release button 3 is half-pressed, and the flow goes to Step F32. If the judgement is negative the flow returns to Step F31 to form a loop awaiting a half-press.

At Step F32 the exposure calculation is carried out based on the luminance information supplied from the photometric circuit 23, and then the flow goes to Step F33.

At Step F33 it is judged whether the switch 17 is on, that is, whether the lower light shielding plate 10 is at the position inside the aperture 9. If the switch 17 is on the judgement is affirmative and the flow goes to Step F36, whereas if the judgement is negative the flow goes to Step F34.

At Step F34 it is judged whether the switch 18 is on, that is, whether the upper light shielding plate 11 is at the position outside the aperture. If the switch 18 is on the judgement is affirmative and the flow goes to Step F35. If the judgement is negative the flow goes to Step F38.

Step F35, which the flow reaches after the negative judgement at Step F33 and the affirmative judgement at Step F34, corresponds to the normal photographic state in which the both light shielding plates 10, 11 are withdrawn from the aperture 9. Thus at Step F35 the LED indicating device 21 is turned off to show the normal photographic state, and the flow proceeds to Step F39.

At Step F36 to which the flow proceeds after the affirmative judgement at Step F33, it is judged in the same manner as at Step F34 whether the switch 18 is on. If the switch 18 is on the judgement is affirmative and the flow goes to Step F38. If the judgement is negative the flow goes to Step F37.

Step F37, to which the flow proceeds after the affirmative judgement at Step F33 and the negative judgement at Step F36, corresponds to the panoramic photographic state in which the both light shielding plates 10, 11 are inside the aperture 9. Thus at Step F37 the LED indicating device 21 is turned on to show the panoramic photographic state, and the flow proceeds to Step F39.

Step F38 is proceeded to after the double negative judgements at Steps F33 and F34 or after the double affirmative judgements at Steps F33 and F36, and represents an abnormal state which is neither the normal photographic state nor the panoramic photographic state. Thus at Step F38 the LED indicating device 21 is turned on and off (or flashed) to give a warning of abnormal state, and the flow returns to Step F31.

At Step F39 after Step F35 or F37 it is judged whether SW2 is on, that is, whether the release button 3 is fully pressed. If the release button 3 is in the full-press state the judgement is affirmative and the flow goes to Step F40. If the judgement is negative the flow returns to Step F31.

At Step F40 a photographic operation is carried out by controlling the aperture and the shutter speed based on the exposure calculation at Step F32, and then the flow goes to Step F41.

At Step F41 the film is wound by one frame by the motor 26, and the flow returns to Step F31.

According to the above procedure, in case of the normal photographic state as shown in FIG. 2, the switch 17 is off and the switch 18 is on, so that the flow goes from Step F33 through Steps F34 and F35 to Step F39 to turn off the LED indicating device 21, where photography can be carried out with full-press of the release button 3.

In case of the panoramic photographic state as shown in FIG. 3, the switch 17 is on and the switch 18 is off, so that the flow goes from Step F33 through Steps F36 and F37 to Step F39, whereby the LED indicating device 21 is turned on and photography can be carried out with full-press of the release button 3.

In case of an abnormal state which is neither the normal photographic state nor the panoramic photographic state, for example on the midway of switching, the switch 17 and the switch 18 both are on, so that the flow goes from Step F33 through Step F36 to Step F38 and returns to Step F31, whereby the LED indicating device 21 is turned on and off. Since the flow does not proceed to Step F39, photography is inhibited in this state.

Further, in case that a trouble is caused in the switch mechanism of photographic mode, an abnormal state, will be detected. For example, if the lower light shielding plate 10 should have a trouble of operation when the panoramic photographic mode is taken, the switches 17 and 18 both would be off, so that the flow goes from Step F33 through Step F34 to Step F38 and returns to Step F31, whereby the LED indicating device 21 is turned on and off. Since the flow does not proceed to Step F39, photography is inhibited in this state. Also, if the upper light shielding plate 11 has a trouble of operation, the same state as the above case on the way of switching would be expected.

Although the present embodiment employs the LED indicating device for indication, a liquid crystal indicating device may be also employed, or a buzzer may be used to give a warning.

Although the present embodiment uses the normal photographic image plane and the panoramic photographic image plane as the plural opening shapes, the invention is not limited to those. For example, the shape of opening may be vertically elongated, half-sized, or reduced without changing a ratio of height to width. The invention may also be applied to a camera having three or more changeable opening shapes.

According to the present invention, even if the shielding plates provided for aperture should be stopped halfway between the predetermined positions, a warning is given in the finder to accurately inform a user of the operation state of shielding plates. When they are halfway, photography is also inhibited, whereby an error in photography may be effectively prevented.

Also, when the shielding plates are directly touched by a hand in an open state of back lid of the camera body and when the drive mechanism of the shielding plates has a trouble because of the touch to interfere the correct movement of shielding plates, a warning or the photography inhibition is effected, whereby the reliability may be improved without necessity to open the back lid for check.

Another embodiment of the present invention is next explained with FIG. 7 to FIG. 11. In the present embodiment an intermediate photographic mode is added in addition to the normal photographic mode and the panoramic photographic mode. The intermediate photographic mode has a ratio of height to width of photographic image plane which is smaller than that in the normal photographic mode but greater than that in the panoramic photographic mode. Consequently, the intermediate photographic mode has a photographic range which is narrower than the normal photographic range but broader than the panoramic photographic range. The same reference numerals are given to the same elements as in the above-described embodiment.

Figure 7:
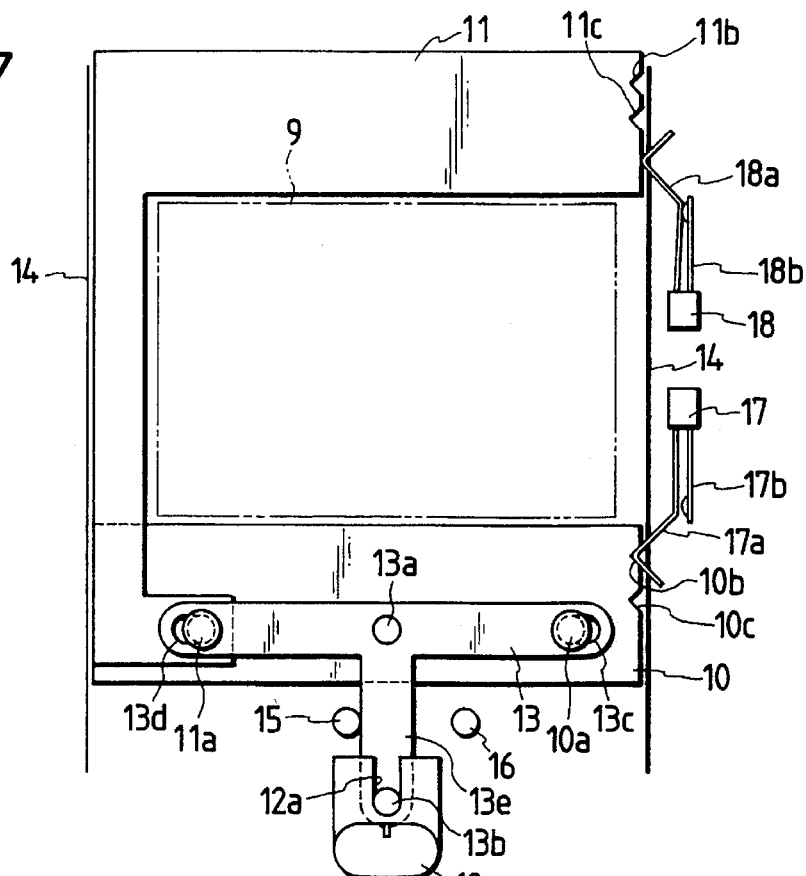
FIG. 7 is an elevation to show a light shielding plate driving mechanism in the normal photographic state in another embodiment.

FIG. 7 is an elevation to show a driving mechanism of light shielding plates. A light shielding plates 10 has a shaft 10a fixed therein and notches 10b and 10c formed thereon, and a light shielding plate 11 has a shaft 11a fixed therein and notches 11b and 11c formed thereon. A switch lever 12 is provided with a forked arm 12a. A drive plate 13 is rotatably supported on a camera body 1 through a shaft 13a thereof, and is provided with a fixed shaft 13b and elongate holes 13c, 13d. The shaft 10a of the light shielding plate 10 is slidably associated with the elongate hole 13c, and the shaft 11a of the light shielding plate 11 with the elongate hole 13d. The shaft 13b is associated with the arm 12a of the switch lever 12. Guides 14 are fixed in the camera body to constrain the light shielding plates 10, 11 to move in the vertical direction. Stoppers 15, 16 are contactable with an arm 13e of the drive plate 13, which are fixed in the camera body 1. A switch 17 has two contact segments 17a and 17b. When the fore end of the contact segment 17a falls in either notch 10b or 10c of the light shielding plate 10, the contact segments 17a and 17b come out of contact with each other to make the switch turned off. The contact segments are in contact with each other to make the switch on at a position other than the engagement positions of the contact segment 17a with either notch. A switch 18 has two contact segments 18a and 18b. When the fore end of the contact segment 18a falls in either notch 11a or 11c of the light shielding plate 11, the contact segments 18a and 18b come out of contact with each other to make the switch turned off. The contact segments are in contact with each other to make the switch on at a position other than the engagement positions of the contact segment 18a with either notch.

Figure 8:
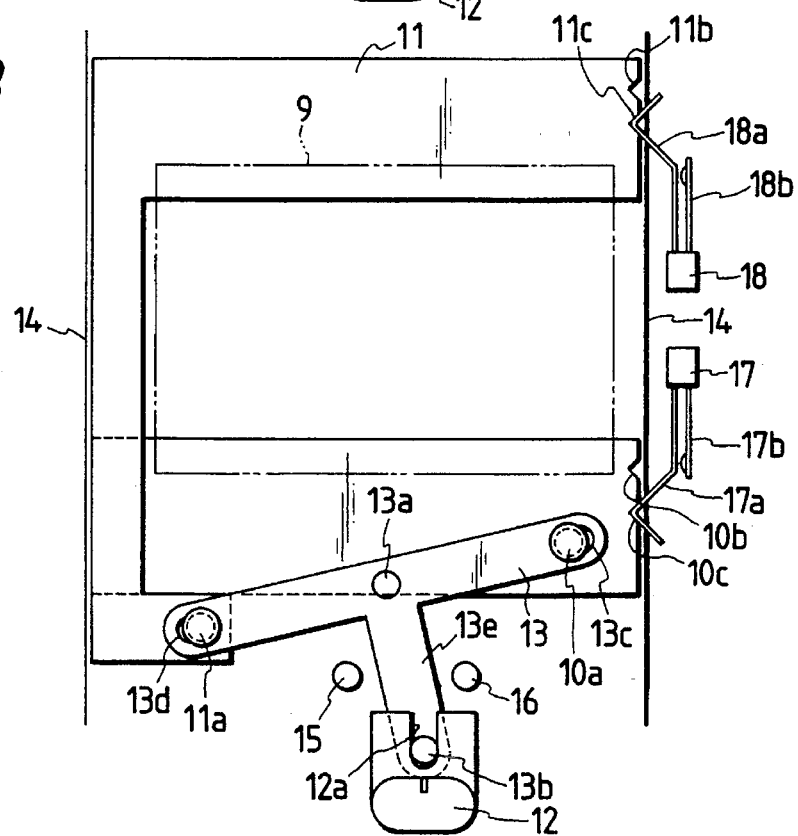
FIG. 8 is an elevation to show the light shielding plate driving mechanism in an intermediate photographic state in the another embodiment.

An operation of this mechanism will be described. FIG. 7 shows a state of normal photographic mode, in which the light shielding plates 10, 11 are withdrawn outside the aperture 9 after the switch lever 12 is slid to the left. If the photographer attempts to slide switch lever 12 from this state further to the left, the drive plate 13 would be stopped, because the arm 13e contacts with the stopper 15. When the switch lever 12 is slid to the right, the drive plate 13 rotates counterclockwise about the shaft 13a. Since the shaft 10a of the light shielding plate 10 is associated with the elongate hole 13c of the drive plate 13, the light shielding plate 10 moves upward along the guides 14. Also, since the shaft 11a of the light shielding plate 11 is associated with the elongate hole 13d of the drive plate 13, the light shielding plate 11 moves downward along the guides 14. While the light shielding plate 10 is moving upward, the fore end of the contact segment 17a of the switch 17 leaves the notch 10b and comes to contact with the contact segment 17b to make the switch turned on. At this point, the fore end of the contact segment 18a of the switch 18 has not fallen in the notch 11c of the light shielding plate 11 and keeps contacting with the contact segment 18c to keep the switch on. As the switch lever 12 is slid further to the right, the light shielding plate 10 further moves upward, and the fore end of the contact segment 17a of the switch 17 comes to fall into the notch 10c to maintain the light shielding plate 10 at this position, whereby the contact segment 17a moves out of contact with segment 17b to make the switch turned off. The light shielding plate 11 also moves further downward and the fore end of the contact segment 18a of the switch 18 comes to fall into the notch 11c to maintain the light shielding plate 11 at this position, whereby the contact segment 18a moves out of contact with the contact segment 18b to make the switch turned off and the intermediate photographic mode is achieved. FIG. 8 shows this state.

Figure 9:
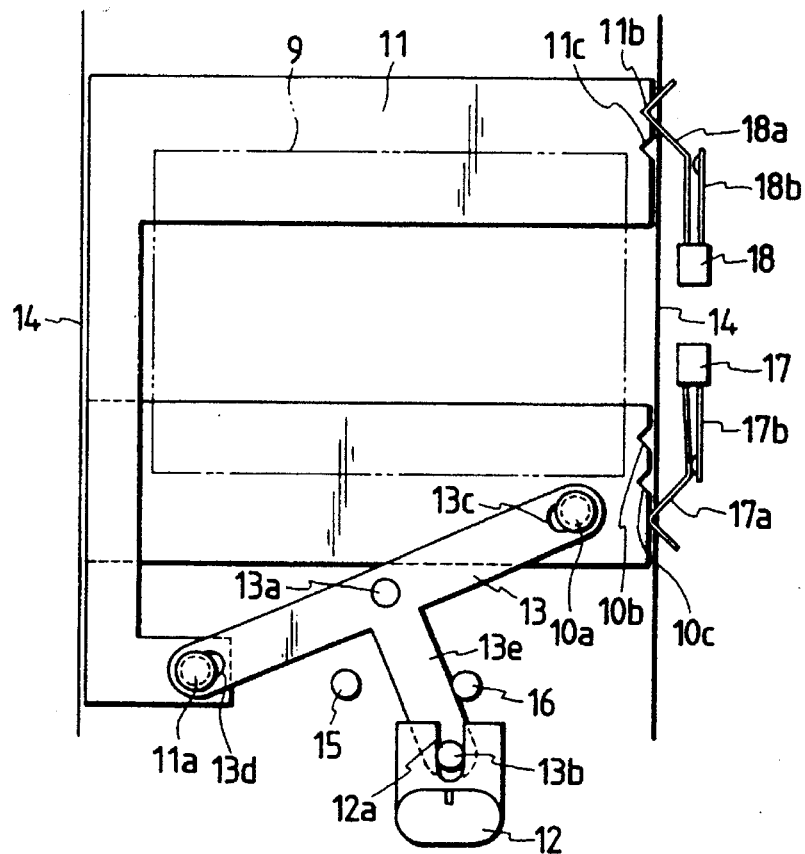
FIG. 9 is an elevation to show the light shielding plate driving mechanism in the panoramic photographic state in the another embodiment.

If the switch lever 12 is slid from the state of FIG. 8 further to the right, the light shielding plate 10 moves further upward and the light shielding plate 11 moves further downward. As the light shielding plate 10 moves upward, the fore end of the contact segment 17a of the switch 17 comes to leave the notch 10c and to contact with the contact segment 17b to make the switch turned on. Also, as the light shielding plate 11 moves further downward, the fore end of the contact segment 18a of the switch 18 comes to leave the notch 11c and to contact with the contact segment 17b to make the switch turned on. If the switch lever 12 is further slid to the right, the light shielding plate 10 is moved further upward but the arm 13e of the drive plate 13 comes to contact with the stopper 16, whereby further movement is restricted. At the same time, the light shielding plate 11 is further moved downward, and the fore end of the contact segment 18a of the switch 18 comes to fall into the notch 11b to maintain the light shielding plate 11 at this position, whereby the contact segment 18a moves out of contact with the contact segment 18b so as to make the switch turned off and the panoramic photographic mode is achieved. FIG. 9 shows this state.

If the switch lever 12 is slid from the state of FIG. 9 back to the left, the drive plate 13 rotates clockwise so that the light shielding plate 10 moves downward and the light shielding plate 11 upward. The switch 18 is once turned on, and thereafter the fore end of the contact segment 18a comes to fall into the notch 11c to maintain the light shielding plate 11 at this position and to moves out of contact with the contact segment 18b so as to make the switch turned off. In addition, the fore end of the contact segment 17a of the switch 17 comes to fall into the notch 10c to maintain the light shielding plate 10 at this position and to move out of contact with the contact segment 17b so as to make the switch turned off, achieving the intermediate photographic mode. As the switch lever 12 is further slid to the left, the drive plate 13 rotates clockwise so that the light shielding plate 10 moves downward and the light shielding plate 11 upward. The switch 18 is first turned on, and thereafter the switch 17 is once turned on. After that, the fore end of the contact segment 17a comes to fall into the notch 10b to maintain the light shielding plates 10, 11 at the respective positions and to move out of contact with the contact segment 17b so as to make the switch turned off, achieving the normal photographic mode.

Accordingly, the switch 17 is off and the switch 18 is on in the normal photographic mode; the switch 17 is off and the switch 18 is also off in the intermediate photographic mode; the switch 17 on and the switch 18 off in the panoramic photographic mode and both switches 17, 18 are on in an abnormal state other than the three modes.

Figure 10:
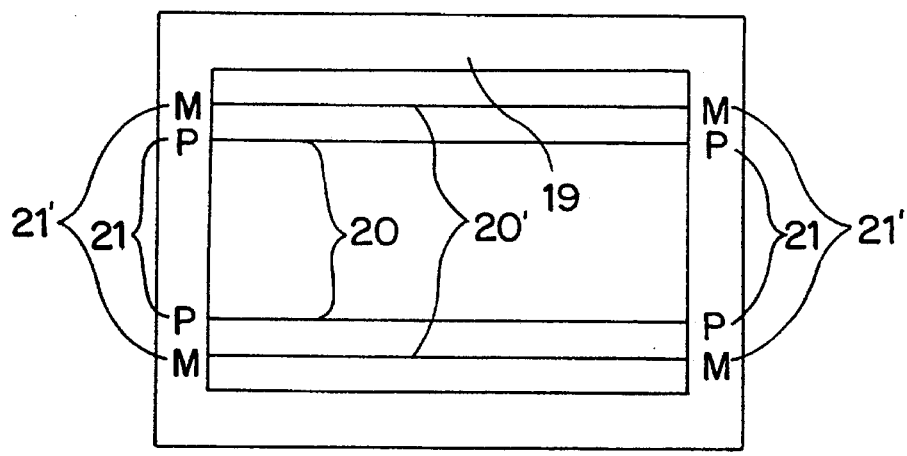
FIG. 10 is an elevation to show an indication condition in a finder of camera in the another embodiment.

FIG. 10 shows a finder, in which a field frame 19 shows a photographic image plane in the normal photographic mode and score lines 20 and 20' are engraved on a finder screen. The score lines 20 show a photographic image plane in the panoramic photographic mode, and the score lines 20' a photographic image plane in the intermediate photographic mode. Indicators 21 and 21' are formed by using LED indicating devices, which are turned off in the normal photographic mode. The indicator 21' is turned on in the intermediate photographic mode, and the indicator 21 is turned on in the panoramic photographic mode. If the switch 17 and the switch 18 are both on, the indicators 21 and 21' are turned on and off (or flashed) to give a warning to show that the photographic mode is incorrect.

Figure 11:
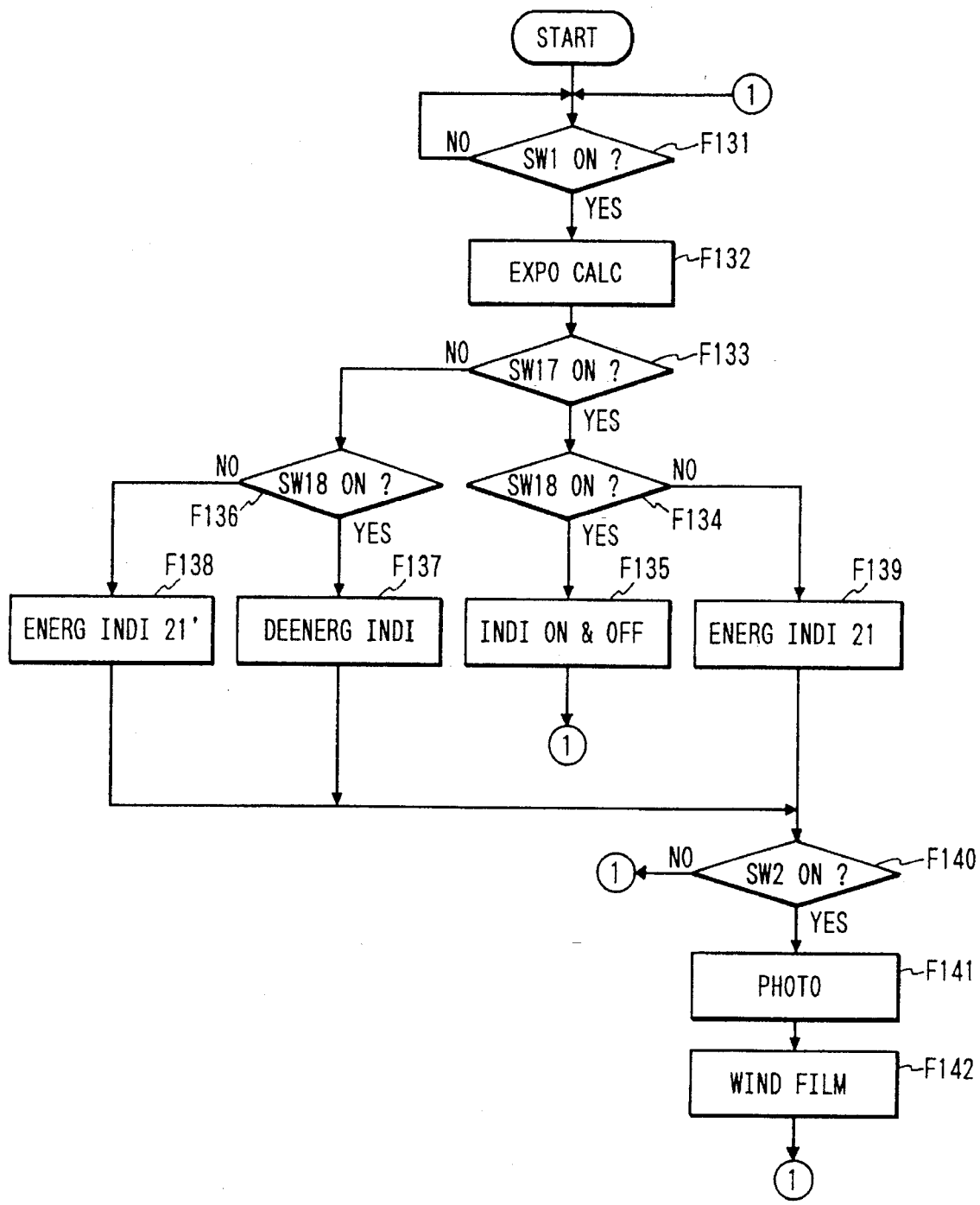
FIG. 11 is a flowchart to show a flow of control of CPU in the another embodiment.

A procedure of control executed in the CPU 22 is next described with reference to the flowchart of FIG. 11. This program is started when the power switch SW3 is turned on.

It is first judged at Step F131 whether SW1 is on. If the release button 3 is in the half-press state, the judgement is affirmative and the flow goes to Step F132. If the judgement is negative the flow returns to Step F131 to form a loop. At Step F132 exposure calculation is carried out based on luminance information input from the photometry circuit 23, and the flow goes to Step F133. At Step F133 it is judged whether SW17 is on. If the switch 17 is on, the judgement is affirmative and the flow goes to Step F134. If the judgement is negative the flow goes to Step F136. At Step F134 it is judged whether SW18 is on. If the switch 18 is on, the judgement is affirmative and the flow goes to Step F135. If the judgement is negative the flow goes to Step F139. At Step F135 the LED indicators 21, 21' are turned on and off to give a warning to show that the photographic mode is neither of the normal photographic mode, the intermediate photographic mode, and the panoramic photographic mode, and the flow returns to Step F131.

At Step F136 it is judged in the same manner as at Step F134 whether SW18 is on. If the switch 18 is on, the judgement is affirmative and the flow goes to Step F137. If the judgement is negative the flow goes to Step F138. At Step F137 the LED indicators 21, 21' are turned off to show that the photographic mode is the normal photographic mode, and the flow goes to Step F140. At Step F138 the LED indicator 21' is turned on to show that the photographic mode is the intermediate photographic mode.

Also, at Step F139 the LED indicator 21 is turned on to show that the photographic mode is the panoramic photographic mode, and the flow goes to Step F140. At Step F140 it is judged whether SW2 is on. If the release button 3 is in the full-press state, the judgement is affirmative and the flow goes to Step F141. If the judgement is negative the flow returns to Step F131. At Step F141 the aperture and the shutter speed are controlled based on the exposure calculation at Step F132 and photography is carried out, and then the flow goes to Step F142. At Step F142 the film is wound by one frame by the motor 26, and the flow returns to Step F131.

According to the above procedure, in case of the normal photographic mode as shown in FIG. 7, the switch 17 is off and the switch 18 is on, so that the flow goes from Step F133 through Steps F136 and F137 to Step F140, turning off the LED indicators 21, 21' and being ready for photography with full-press of the release button 3.

Also, in case of the intermediate photographic mode as shown in FIG. 8, the switch 17 is off and the switch 18 is also off, so that the flow goes from Step F133 through Steps F136 and F138 to Step F140, turning on the LED indicator 21' and being ready for photography with full-press of the release button 3.

Further, in case of the panoramic photographic mode as shown in FIG. 9, the switch 17 is on and the switch 18 is off, so that the flow goes from Step F133 through Steps F134 and F139 to Step F140, turning on the LED indicator 21 and being ready for photography with full-press of the release button 3.

Also, in case of a halfway position between the normal photographic mode and the intermediate photographic mode, or in case of a halfway position between the intermediate photographic mode and the panoramic photographic mode, the switch 17 and the switch 18 are both on, so that the flow goes from Step F133 through Step F134 to Step F135 and returns to Step F131, turning on and off the LED indicators 21, 21' without going to Step F140, and thus inhibiting photography in this state.

What is claimed is:

1. A camera enabling photography with a plurality of selectable image plane formats, comprising:

an aperture portion having an opening for permitting photographic light to pass therethrough to a photographing image plane;

a light shield movable to a plurality of predetermined selectable positions to change a shape of said opening of said aperture portion;

an operation member for moving said light shield to said predetermined positions;

detecting means for detecting an actual position of said light shield and providing a detection result indicating whether said light shield is positioned at one of said predetermined positions or other than at said predetermined positions; and indicating means responsive to said detecting means for automatically making indications which are changed in accordance with changes in a detection result of said detecting means.

2. A camera according to claim 1, wherein said light shield is movable between a normal photographic position and a panoramic photographic position.

3. A camera enabling photography with a plurality of selectable image plane formats, comprising:

an aperture portion having an opening for permitting photographic light to pass therethrough;

a light shield movable to a plurality of predetermined selectable positions to change a shape of said opening of said aperture portion, including a normal photographic position and a panoramic photographic position;

an operation member for moving said light shield to said predetermined positions;

detecting means for detecting whether said light shield is positioned at one of said predetermined positions or other than at said predetermined positions; and indicating means responsive to said detecting means for automatically making indications which are changed in accordance with changes in a detection result of said detecting means;

wherein said detecting means has first and second switches, said first switch has a predetermined state when said light shield is positioned at the normal photographic position, and said second switch has a predetermined state when said light shield is positioned at the panoramic photographic position, and said indicating means makes a first indication when only said first switch is in its predetermined state, a second indication when only said second switch is in its predetermined state, and a third indication when both switches are in a same state.

4. A camera according to claim 3, wherein said light shield includes a first shielding member associated with said first switch and a second shielding member associated with said second switch.

5. A camera according to claim 1, wherein said light shield is movable to a normal photographic position, a panoramic photographic position, and an intermediate photographic position at which a ratio of height to width of the photographic image plane is smaller than that at said normal photographic position but greater than that at said panoramic photographic position.

6. A camera enabling photography with a plurality of selectable image plane formats, comprising:

an aperture portion having an opening for permitting photographic light to pass therethrough;

a light shield movable to a plurality of predetermined selectable positions to change a shape of said opening of said aperture portion, including a normal photographic position, a panoramic photographic position, and an intermediate photographic position at which a ratio of height to width of the photographic image plane is smaller than that at said normal photographic position but greater than that at said panoramic photographic position;

an operation member for moving said light shield to said predetermined positions;

detecting means for detecting whether said light shield is positioned at one of said predetermined positions or other than at said predetermined positions; and indicating means responsive to said detecting means for automatically making indications which are changed in accordance with changes in a detection result of said detecting means;

wherein said detecting means has first and second switches, said first switch has a predetermined state when said light shield is positioned at the normal photographic position, said second switch has a predetermined state when said light shield is positioned at the panoramic photographic position, and both switches have their respective predetermined states when said light shield is positioned at the intermediate photographic position, and said indicating means makes a first indication when only said first switch is in its predetermined state, a second indication when only said second switch is in its predetermined state, a third indication when both of said switches are in their respective predetermined states, and a fourth indication when neither of said switches is in its predetermined state.

7. A camera enabling photography with a plurality of selectable image plane formats, comprising:

an aperture portion having an opening for permitting photographic light to pass therethrough to a photographing image plane;

a light shield movable to a plurality of predetermined selectable positions to change a shape of said opening of said aperture portion;

an operation member connected to said light shield for moving said light shield to said predetermined positions;

detecting means for detecting an actual position of said light shield and providing a detection result indicating when said light shield is positioned other than at said predetermined positions; and inhibiting means for automatically inhibiting photography in response to a detection result of said detecting means indicating that said light shield is positioned other than at said predetermined positions.

8. A camera according to claim 7, wherein said light shield is movable between a normal photographic position and a panoramic photographic position.

9. A camera according to claim 8, wherein said detecting means has first and second switches, said first switch has a predetermined state when said light shield is positioned at the normal photographic position, and said second switch has a predetermined state when said light shield is positioned at the panoramic photographic position, and said inhibiting means allows photography when only one of said switches is in its predetermined state, and inhibits photography when both of said switches are in a same state.

10. A camera according to claim 9, wherein said light shield includes a first shielding member associated with said first switch and a second shielding member associated with said second switch.

11. A camera according to claim 7, wherein said light shield is movable to a normal photographic position, a panoramic photographic position, and an intermediate photographic position at which a ratio of height to width of the photographic image plane is smaller than that at said normal photographic position but greater than that at said panoramic photographic position.

12. A camera according to claim 11, wherein said detecting means has first and second switches, said first switch has a predetermined state when said light shield is positioned at the normal photographic position, said second switch has a predetermined state when said light shield is positioned at the panoramic photographic position, and both switches have their respective predetermined states when said light shield is positioned at the intermediate photographic position, and said inhibiting means inhibits photography when neither of said switches is in its respective predetermined state.

13. A camera enabling photography with a plurality of selectable image plane formats, comprising:

an aperture portion having an opening for permitting photographic light to pass therethrough to a photographing image plane;

a light shield movable to a plurality of predetermined selectable positions to change a shape of said opening of said aperture portion;

an operation member for moving said light shield to said predetermined positions;

a detector for detecting an actual position of said light shield and providing a detection result indicating whether said light shield is positioned at one of said predetermined positions or other than at said predetermined positions; and an indicator for making indications automatically in response to a detection by said detector, said indications being changed in accordance with changes in a detection result of said detector.

14. A camera according to claim 13, wherein said light shield is movable between a normal photographic position and a panoramic photographic position.

15. A camera enabling photography with a plurality of selectable image plane formats, comprising:

an aperture portion having an opening for permitting photographic light to pass therethrough;

a light shield movable to a plurality of predetermined selectable positions to change a shape of said opening of said aperture portion, including a normal photographic position and a panoramic photographic position;

an operation member for moving said light shield to said predetermined positions;

a detector for detecting whether said light shield is positioned at one of said predetermined positions or other than at said predetermined positions; and an indicator for making indications automatically in response to a detection by said detector, said indications being changed in accordance with changes in a detection result of said detector;

wherein said detecting means has first and second switches, said first switch has a predetermined state when said light shield is positioned at the normal photographic position, and said second switch has a predetermined state when said light shield is positioned at the panoramic photographic position, and said indicator makes a first indication when only said first switch is in its predetermined state, a second indication when only said second switch is in its predetermined state, and a third indication when both switches are in a same state.

16. A camera according to claim 15, wherein said light shield includes a first shielding member associated with said first switch and a second shielding member associated with said second switch.

17. A camera according to claim 13, wherein said light shield is movable to a normal photographic position, a panoramic photographic position, and an intermediate photographic position at which a ratio of height to width of the photographic image plane is smaller than that at said normal photographic position but greater than that at said panoramic photographic position.

18. A camera enabling photography with a plurality of selectable image plane formats, comprising:

an aperture portion having an opening for permitting photographic light to pass therethrough;

a light shield movable to a plurality of predetermined selectable positions to change a shape of said opening of said aperture portion, including a normal photographic position, a panoramic photographic position, and an intermediate photographic position at which a ratio of height to width of the photographic image plane is smaller than that at said normal photographic position but greater than that at said panoramic photographic position;

an operation member for moving said light shield to said predetermined positions;

a detector for detecting whether said light shield is positioned at one of said predetermined positions or other than at said predetermined positions; and an indicator for making indications automatically in response to a detection by said detector, said indications being changed in accordance with changes in a detection result of said detector;

wherein said detecting means has first and second switches, said first switch has a predetermined state when said light shield is positioned at the normal photographic position, said second switch has a predetermined state when said light shield is positioned at the panoramic photographic position, and both switches have their respective predetermined states when said light shield is positioned at the intermediate photographic position, and said indicator makes a first indication when only said first switch is in its predetermined state, a second indication when only said second switch is in its predetermined state, a third indication when both of said switches are in their respective predetermined states, and a fourth indication when neither of said switches is in its predetermined state.

19. A camera enabling photography with a plurality of selectable image plane formats, comprising:

an aperture portion having an opening for permitting photographic light to pass therethrough to a photographing image plane;

a light shield movable to a plurality of predetermined selectable positions to change a shape of said opening of said aperture portion;

an operation member connected to said light shield for moving said light shield to said predetermined positions;

a detector for detecting actual position of said light shield and providing a detection result indicating when said light shield is positioned other than at said predetermined positions; and an inhibiting portion for automatically inhibiting photography in response to a detection result of said detector indicating that said light shield is positioned other than at said predetermined positions.

20. A camera according to claim 19, wherein said light shield is movable between a normal photographic position and a panoramic photographic position.

21. A camera according to claim 20, wherein said detecting means has first and second switches, said first switch has a predetermined state when said light shield is positioned at the normal photographic position, and said second switch has a predetermined state when said light shield is positioned at the panoramic photographic position, and said inhibiting portion allows photography when only one of said switches is in its predetermined state, and inhibits photography when both of said switches are in a same state.

22. A camera according to claim 21, wherein said light shield includes a first shielding member associated with said first switch and a second shielding member associated with said second switch.

23. A camera according to claim 19, wherein said light shield is movable to a normal photographic position, a panoramic photographic position, and an intermediate photographic position at which a ratio of height to width of the photographic image plane is smaller than that at said normal photographic position but greater than that at said panoramic photographic position.

24. A camera according to claim 23, wherein said detector has first and second switches, said first switch has a predetermined state when said light shield is positioned at the normal photographic position, said second switch has a predetermined state when said light shield is positioned at the panoramic photographic position, and both switches have their respective predetermined states when said light shield is positioned at the intermediate photographic position, and said inhibiting portion inhibits photography when neither of said switches is in its respective predetermined state.

25. A camera enabling photography with a plurality of selectable image plane formats, comprising:

an aperture portion having an opening for permitting photographic light to pass therethrough to a photographing image plane;

a pair of light shielding members movable to define a plurality of predetermined selectable shapes of said opening of said aperture portion;

detecting means for individually detecting whether each light shielding members is positioned so as to define a shape other than said predetermined shapes; and inhibiting means for automatically inhibiting photography in response to a detection result of said detecting means indicating that said light shielding members are positioned so as to define a shape other than said predetermined shapes.

26. A camera according to claim 25, wherein said detecting means includes a pair of switches each of which changes state depending on the position of a corresponding one of said light shielding members.

27. A camera according to claim 25, wherein said inhibiting means inhibits photography in response to at least one predetermined combination of states of said switches.

28. A camera according to claim 27, wherein said inhibiting means allows photography in response to at least two predetermined combinations of states of said switches which are different from said one predetermined combination.

29. A camera according to claim 25, wherein said predetermined shapes include a first shape for normal photography and a second shape for panoramic photography.

30. A camera according to claim 29, wherein said detecting means includes a pair of switches each of which changes state depending on the position of a corresponding one of said light shielding members.

31. A camera according to claim 30, wherein said inhibiting means inhibits photography in response to a combination of states of said switches corresponding to a shape other than said first and second shapes.

32. A camera according to claim 31, wherein said inhibiting means allows photography in response to predetermined combinations of states of said switches corresponding to said first and second shapes.

33. A camera according to claim 25, wherein said predetermined shapes include a first shape for normal photography, a second shape for panoramic photography, and a third shape at which a ratio of height to width of the photographic image plane is smaller than for normal photography but greater than for panoramic photography.

34. A camera according to claim 33, wherein said detecting means includes a pair of switches each of which changes state depending on the position of a corresponding one of said light shielding members.

35. A camera according to claim 34, wherein said inhibiting means inhibits photography in response to a combination of states of said switches corresponding to a shape other than said first, second, and third shapes.

36. A camera according to claim 35, wherein said inhibiting means allows photography in response to combinations of states of said switches corresponding to said first, second, and third shapes.

37. A camera according to claim 25, wherein said predetermined shapes include a first shape for normal photography and a second shape for panoramic photography.

38. A camera according to claim 37, wherein said detecting means includes a pair of switches each of which changes state depending on the position of a corresponding one of said light shielding members.

39. A camera enabling photography with a plurality of selectable image plane formats, comprising:

an aperture portion having an opening for permitting photographic light to pass therethrough;

a pair of light shielding members movable to define a plurality of predetermined selectable shapes of said opening of said aperture portion, including a first shape for normal photography and a second shape for panoramic photography;

detecting means for detecting whether said light shielding members are positioned so as to define a shape other than said predetermined shapes, said detecting means including a pair of switches each of which changes state depending on the position of a corresponding one of said light shielding members; and indicating means responsive to said detecting means for automatically making indications which are changed in accordance with changes in a detection result of said detecting means;

wherein said indicating means makes a first indication in response to a combination of states of said switches corresponding to said first shape, a second indication in response to a combination of states of said switches corresponding to said second shape, and a third indication in response to a combination of states of said switches corresponding to neither of said first and second shapes.

40. A camera enabling photography with a plurality of selectable image plane formats, comprising:

an aperture portion having an opening for permitting photographic light to pass therethrough to a photographing image plane;

a pair of light shielding members movable to define a plurality of predetermined selectable shapes of said opening of said aperture portion;

detecting means for individually detecting whether each light shielding member is positioned so as to define a shape other than said predetermined shapes; and indicating means responsive to said detecting means for automatically making indications which are changed in accordance with changes in a detection result of said detecting means.

41. A camera according to claim 40, wherein said detecting means includes a pair of switches each of which changes state depending on the position of a corresponding one of said light shielding members.

42. A camera according to claim 41, wherein said indicating means changes said indications in accordance with changes in a combination of states of said switches.

43. A camera according to claim 40, wherein said predetermined shapes include a first shape for normal photography, a second shape for panoramic photography, and a third shape at which a ratio of height to width of the photographic image plane is smaller than for normal photography but greater than for panoramic photography.

44. A camera according to claim 43, wherein said detecting means includes a pair of switches each of which changes state depending on the position of a corresponding one of said light shielding members.

45. A camera enabling photography with a plurality of selectable image plane formats, comprising:

an aperture portion having an opening for permitting photographic light to pass therethrough;

a pair of light shielding members movable to define a plurality of predetermined selectable shapes of said opening of said aperture portion, including a first shape for normal photography, a second shape for panoramic photography, and a third shape at which a ratio of height to width of the photographic image plane is smaller than for normal photography but greater than for panoramic photography;

detecting means for detecting whether said light shielding members are positioned so as to define a shape other than said predetermined shapes, said detecting means including a pair of switches each of which changes state depending on the position of a corresponding one of said light shielding members; and indicating means responsive to said detecting means for automatically making indications which are changed in accordance with changes in a detection result of said detecting means;

wherein said indicating means makes a first indication in response to a combination of states of said switches corresponding to said first shape, a second indication in response to a combination of states of said switches corresponding to said second shape, a third indication in response to a combination of states of said switches corresponding to said third shape, and a fourth indication in response to a combination of states of said switches corresponding to none of said first, second, and third states.

* * * * *